United States Patent [19]
Uchidoi et al.

[11] 4,349,263
[45] Sep. 14, 1982

[54] EXPOSURE TIME CONTROL DEVICE FOR CAMERA

[75] Inventors: Masanori Uchidoi, Yokohama; Kazunobu Urushihara, Inagi, both of Japan

[73] Assignee: Canon Kabushiki Kaisha, Tokyo, Japan

[21] Appl. No.: 144,981

[22] Filed: Apr. 30, 1980

[30] Foreign Application Priority Data

May 8, 1979 [JP] Japan ................................. 54-56538

[51] Int. Cl.³ ............................................. G03B 9/62
[52] U.S. Cl. ................................ 354/234; 354/23 D; 354/50; 354/238
[58] Field of Search ................... 354/23 D, 43, 50, 51, 354/60 R, 60 A, 234, 235, 238, 258

[56] References Cited
U.S. PATENT DOCUMENTS 3,683,767  8/1972  Sahara ..................................... 354/51
4,034,383  7/1977  Mashimo et al. ..................... 354/23 D

*Primary Examiner*—Russell E. Adams
*Attorney, Agent, or Firm*—Toren, McGeady & Stanger

[57] ABSTRACT

In the exposure time control device disclosed, a first timer sets a first time interval equal to a desired exposure time but establishes an exposure time in the shutter different from the desired exposure time. A second timing arrangement forms a compensation time interval. Suitable means maintain the opening of the shutter for a total time equal to the given time interval and the compensation time interval so that the shutter is open for the desired exposure time. A control shortens the given time interval formed by the first timing arrangement by a predetermined time interval so that the given time interval formed is shorter than the desired exposure time. This permits compensation not only for errors which tend to shorten the exposure time, but also those which tend to lengthen the exposure time.

1 Claim, 5 Drawing Figures

FIG.4

| EXPOSURE TIME | D1 | D2 | D3 | D4 | D5 | D6 | D7 | DECODER | NAND GATE |
|---|---|---|---|---|---|---|---|---|---|
| 8 | 0 | 0 | 0 | 1 | 1 | 0 | 1 | D | $N_{14}$ |
| 4 | 0 | 0 | 0 | 1 | 1 | 0 | 0 | C | $N_{13}$ |
| 2 | 0 | 0 | 0 | 1 | 0 | 1 | 1 | B | $N_{12}$ |
| 1 | 0 | 0 | 0 | 1 | 0 | 1 | 0 | A | $N_{11}$ |
| $\frac{1}{2}$ | 0 | 0 | 0 | 1 | 0 | 0 | 1 | 9 | $N_{10}$ |
| $\frac{1}{4}$ | 0 | 0 | 0 | 1 | 0 | 0 | 0 | 8 | $N_9$ |
| $\frac{1}{8}$ | 0 | 0 | 0 | 0 | 1 | 1 | 1 | 7 | $N_8$ |
| $\frac{1}{15}$ | 0 | 0 | 0 | 0 | 1 | 1 | 0 | 6 | $N_7$ |
| $\frac{1}{30}$ | 0 | 0 | 0 | 0 | 1 | 0 | 1 | 5 | $N_6$ |
| $\frac{1}{60}$ | 0 | 0 | 0 | 0 | 1 | 0 | 0 | 4 | $N_5$ |
| $\frac{1}{125}$ | 0 | 0 | 0 | 0 | 0 | 1 | 1 | 3 | $N_4$ |
| $\frac{1}{250}$ | 0 | 0 | 0 | 0 | 0 | 1 | 0 | 2 | $N_3$ |
| $\frac{1}{500}$ | 0 | 0 | 0 | 0 | 0 | 0 | 1 | 1 | $N_2$ |
| $\frac{1}{1000}$ | 0 | 0 | 0 | 0 | 0 | 0 | 0 | 0 | $N_1$ |

EXPOSURE TIME CONTROL DEVICE FOR CAMERA

BACKGROUND OF THE INVENTION

This invention relates to cameras, shutters, and particularly to an exposure time control circuit to compensate for exposure errors ascribable to the overlap of curtains in a slit shutter.

Photographic cameras having slit shutters, such as focal plane shutters, control exposure times after a shutter release is actuated by initiating a timed interval when the leading shutter curtain starts to run. When the timed interval has passed, the trailing curtain of the shutter is released and begins to run. However, when a focal plane shutter is cocked, and prior to actuation of the release, the leading and trailing shutter curtains must overlap partially. The shutter is also susceptible to a response time lag in an electromagnet which controls the release of the trailing curtain. The difference between the positions from which the leading and trailing curtains start to run, and the response lag in the magnet make coincidence between the computed exposure time and the actual exposure time of the photographic material difficult if not impossible to achieve. As the requirements for exposure control accuracy become more rigorous, a control system which merely synchronizes the operation of the shutter and the timer circuit, so that a timing interval is initiated at the start of the movement of the leading shutter curtain and termination of the time interval causes movement of the trailing shutter curtain, has been unable to satisfy these needs.

For this reason, the conventional control system for the camera having the focal plane shutter such as those disclosed, for example, in U.S. Pat. No. 3,683,767 or Japanese laid-open patent application No. Sho 50-45628 has overcome the above-described drawback by providing addition of a certain adjusting time interval to the exposure time. In more detail, with the commonly available focal plane shutter when set in the initial position as shown in FIGS. 1(a) and 1(b), the rear border of the leading curtain LC of the shutter lies at a point FS1 which is different with reference to an image aperture IMA from a point rs1 at which the front border of the trailing curtain TC. In such arrangement, it is at a time $t_1$ (see FIG. 1(b)) that the leading curtain LC starts to run down and also that a timed interval is initiated as shown in FIG. 1(c), and then when the timed interval Te (see FIG. 1(c)) is terminated at a time $t_2$, an electromagnet (not shown) for holding the trailing curtain TC is actuated, causing the trailing curtain TC to run down. But it is actually at a time $t_3$ as delayed by a response time Tmg of the electromagnet that the trailing curtain TC starts to run down. Further since there exists a time gap due to the differentiated locations of the borders of the leading and trailing curtains, the net exposure of the film amounts to a value TA which is not coincident with the timed interval Te, thus failing to satisfy the requirement for accurate exposure control.

That is, as is evident from (b) of FIG. 1, the response time lag Tmg depending upon the electromagnet, the time gap Tg depending upon the partial overlap of the two curtains, the timed interval Te and the actual exposure time TA have a relation as expressed by the formula: $TA + Tg = Te + Tmg$. In other words, the film is exposed to the imaging light for the time interval TA which is elongated from the timed interval Te by the timer circuit by the Tmg and simultaneously shortened therefrom by the Tg. And since these time intervals Tg and Tmg are unequal to each other, the ordinary cameras do not fulfill the requirement $TA = Te$. Therefore, it is necessary to otherwise synchronize the operation of the shutter curtains and the timing device. As the amount of overlap of the curtains in the initial position and the response characteristics of the magnet differ at random with different cameras, however, it is difficult to mechanically establish the prescribed precise synchronization. Because of this, the cameras proposed in the above-cited publications make use of a timer circuit in adding an adjusting time interval Tx to the timed interval Te so that at the termination of duration of $Te + Tx$, the trailing curtain control magnet is actuated to effect $TA = Te$.

That is, as shown on line (d) in FIG. 1, the termination of the timed interval Te is followed by the initiation of an adjusting time interval Tx, and then the trailing curtain control magnet is actuated with the result that the trailing curtain starts to run down at a time $t_4$ as shown in the graph (b) of FIG. 1, and is allowed to take a move as as shown by a dashed line of the graph (b) of FIG. 1, thus obtaining the synchronization with $Te = TA$. In other words, since the conventional cameras are characterized by $Tg > Tmg$, the TA tends to be shorter than the Te. This leads to the relation: $TA + Tg = Te + Tmg + Tx$. Then, Tx is made equal to $Tg - Tmg$ by previously adjusting the time constant of the timer circuit. Thus, the timed interval Te and the actual exposure time TA are made to take the same value, and the above defined relation is realized.

It will be appreciated that the conventional phase error correction system for ensuring coincidence of the actual exposure time with the computed one by taking into account the shutter curtain overlap dependent time gap Tg and the response time lag Tmg of the magnet for individual each camera as these factors take different values with different camera is constructed by using the means for creating the adjusting time interval $(Tx = Tg - Tmg)$ in a quite simple form of the timer circuit.

As the speed of running down movement of the shutter increases, however, when the time gap Tg related to the overlap of the shutter curtains becomes shorter than the response time lag Tmg of the magnet, it is impossible for such simple system to realize the establishment of $Te = TA$, resulting in exposure errors. In other words, as shown in a graph (a) of FIG. 2, when the shutter moves at so fast a speed that the time gap is shortened below the response time lag, the resultant adjusting time interval Tx takes a negative value. The principles of conventional method no longer hold to fulfill the requirement $Te = TA$.

SUMMARY OF THE INVENTION

An object of the present invention is to provide an exposure time control device adapted for use in a camera of which the shutter runs down at a high speed.

Another object of the present invention is to provide an exposure time control device for ensuring coincidence of the actual exposure time with the computed one even when in use with such high speed shutter, while still being of simple construction.

These and other objects of the present invention will become apparent from the following detailed description of an embodiment thereof taken in conjunction with the accompanying drawings.

BRIEF DESCRIPTION OF THE DRAWINGS

FIG. 4 is a table of the contents of the register RE, the outputs of the decoder ED and the NAND gates of FIG. 3 for a series of shutter time increments.

DESCRIPTION OF THE PREFERRED EMBODIMENTS

Figure 3:
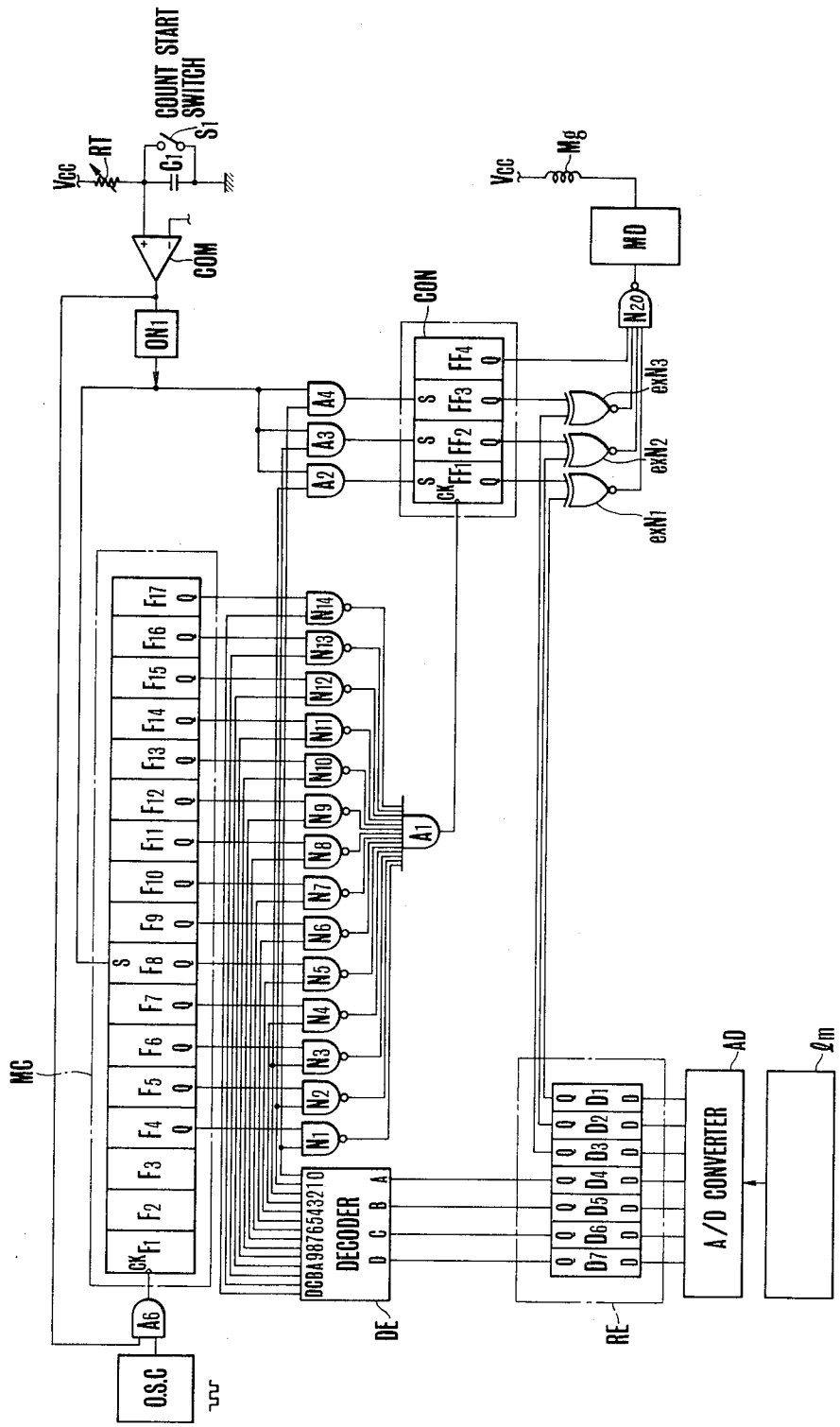
FIG. 3 is an electrical circuit diagram, partly in block form, of one embodiment of an exposure time control device according to the present invention.

FIG. 3 shows one embodiment of an exposure time control circuit according to the present invention. OSC is a clock pulse generator for producing a pulse train at a frequency of 128 KHz. MC is a main counter for exposure time count of 17 bits F1–F17. This counter MC counts the pulses of 128 KHz as has been mentioned above so that the F4 produces output pulses with 8 KHz, F5 with 4 KHz, F6 with 2 KHz, F7 with 1 KHz, F8 with 512 Hz, F9 with 256 Hz, F10 with 128 Hz, F11 with 64 Hz, F12 with 32 Hz, F13 with 16 Hz, F14 with 8 Hz, F15 with 4 Hz, F16 with 2 Hz, and F17 with 1 Hz. lm is an exposure time information output circuit for producing an analogue output corresponding to an exposure time value Tv in Apex based on the object brightness and the like; AD is an analogue to digital converter circuit for converting the output from the information output circuit lm to a digital value with an accuracy of 8 steps in each increment. RE is a latch register consisting of flip-flops D1–D7 with the D1–D3 latching informations below the decimal point, and with the D4–D7 latching informations above the decimal point, that is, with the D1 latching a digital information weighted by $\frac{1}{8}$, D2 by 2/8 D3 by 4/8, D4 by 1, D5 by 2, D6 by 4, and D7 by 8. DE is a decoder for decoding that part of the content of the register RE which is above the decimal point, that is the integer of the information. N1–N14 are two-input NOR gates arranged to be selected one at a time depending upon the output of the decoder, DE, as will be seen from the table of FIG. 4 for the relation of the content of the register RE, the output of the decoder DE, the selected one of the NOR gates and the resultant exposure time. Al is an AND gate having fourteen inputs connected to the respective outputs of the NOR gates N1–N14, CON is a counter consisting of four flip-flops FF1–FF4 and constituting a counter for producing a timed interval together with the above-described main counter MC. A2–A4 are AND gates for setting the above-mentioned constant time interval Tc; exN1–exN3 are exclusive NOR gates provided for the purpose of controlling the exposure time by the fraction of the information N20 is a NAND gate for producing a shutter closing signal; MD is a magnet driver; Mg is a magnet for holding the trailing curtain of the shutter, this magnet having a value of the above-mentioned response time lag Tmg. S1 is a switch arranged to be turned off when the leading curtain runs down; RT, Cl are a variable resistor and a capacitor constituting a time constant circuit, this time constant circuit functioning to create the above-mentioned adjusting time interval $Tx = Tg - Tmg + Tc$ where Tg and Tmg are identical with the above-mentioned Tg and Tmg, and Tc indicates a correction time interval. COM is a comparator; ON1 is a mono-stable multi-vibrator (hereinafter referred to as one-shot circuit). It is noted that the counter MC starts a counting operation in synchronism with the trailing edge of the pulse, and the COM starts a counting operation in synchronism with the leading edge thereof.

Figure 1:
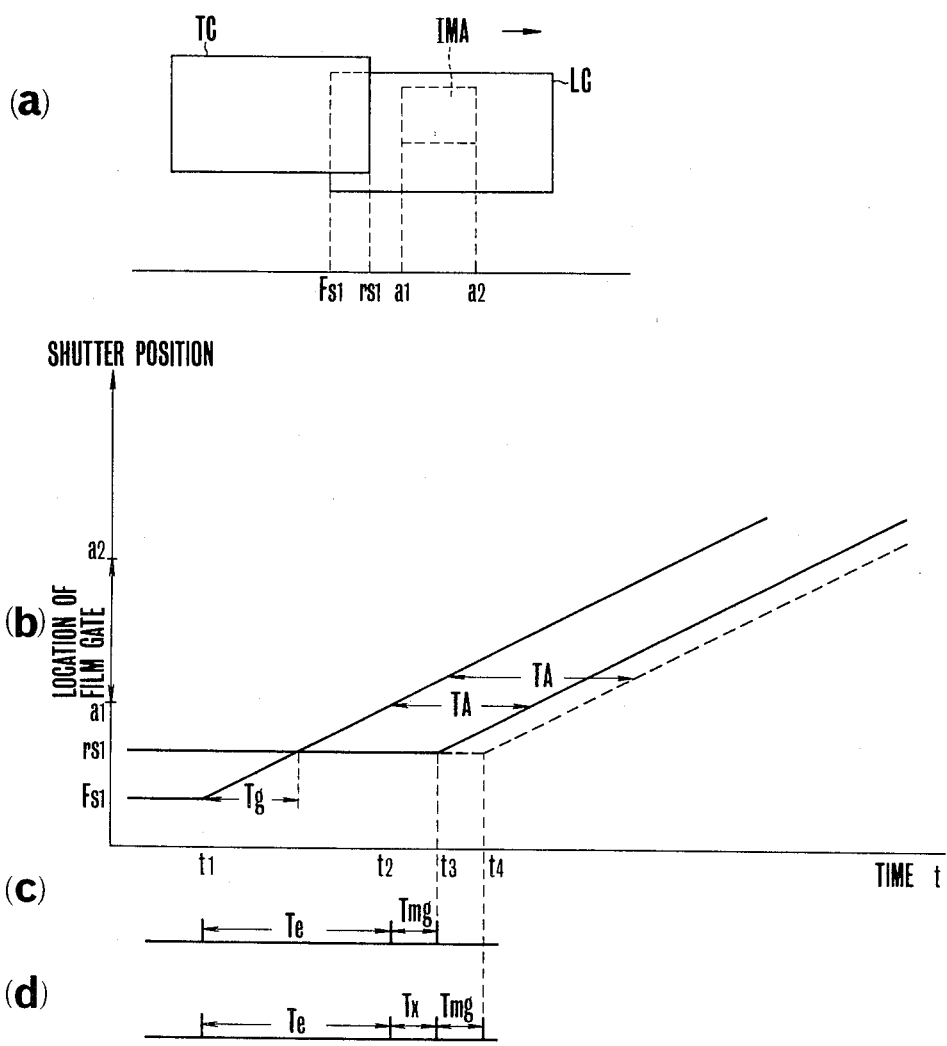
FIG. 1(a) is a schematic plan view showing the start position of a focal plane shutter relative to an exposure window.
FIG. 1(b) is a graph showing the traces of the borders of the curtains when they run down past the exposure window.
FIGS. 1(c) and 1(d) are graphs considered in combination with FIG. 1(b) to define the various factors contributing to a difference between the timed interval and the actual exposure time.
Figure 2:
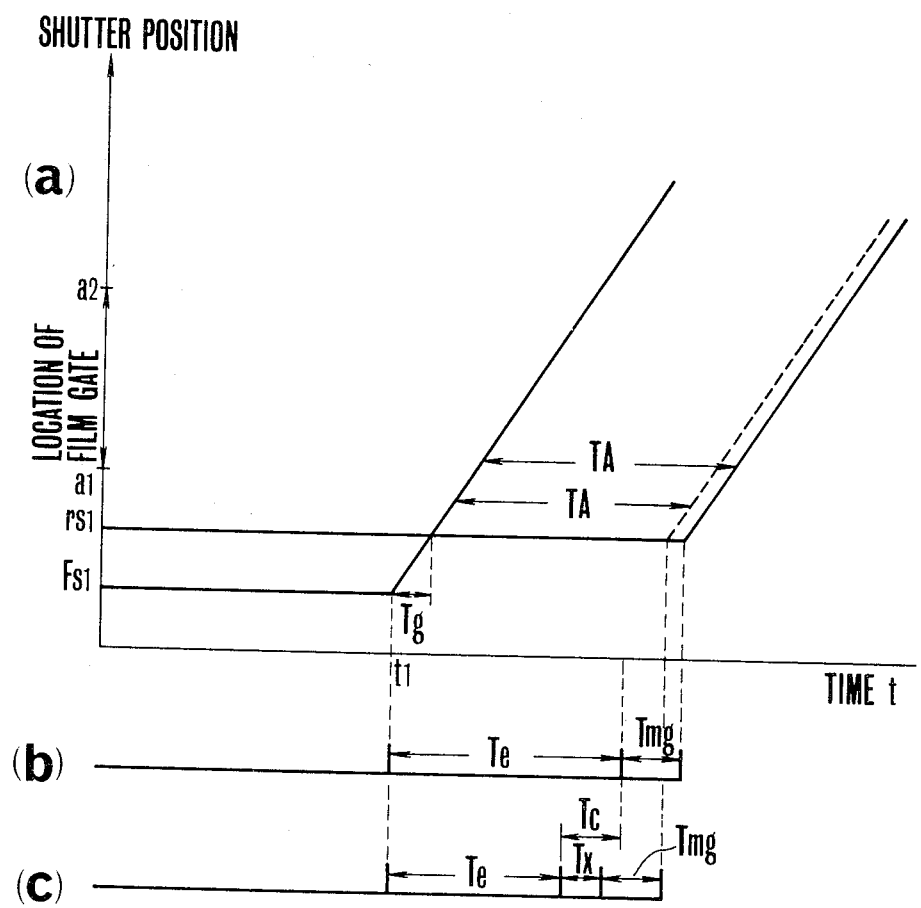
FIGS. 2(a) and 2(b) are graphs showing a change in sign of the difference between the timed interval and the actual exposure time when the shutter curtains run down at so faster a speed than that in FIG. 1.
FIG. 2(c) is a graph considered in combination with FIGS. 2(a) and 2(b) to assess an exposure correction factor in an exposure time control device of the present invention.

The operation of the circuit of FIG. 3 is as follows: Now assuming that the above-defined correction time interval takes a constant value of 0.5 milliseconds, and the photosensitive element containing information output circuit lm produces an output representing 1/1000 second in exposure time, then all the outputs D1–D7 of the register RE are of low level (hereinafter referred to as "O") as shown in FIG. 4, causing the decoder DE to produce an output of high level (hereinafter referred to as "1") at the output stage 0, and therefore causing selection of the NAND gate N1. Then, when a shutter release is actuated, the leading curtain of the shutter starts to run down at a time point $t_1$ in the graphs (a) and (c) of FIG. 2, and the switch S1 is turned off simultaneously, thus initiating a preliminary timed interval $Tx = Tg - Tmg + Tc$ by the RT and Cl. When this interval is terminated, the comparator COM changes its output to "1". Responsive to this, the one-shot circuit ON1 produces a pulse which is then applied to the AND gates A2–A4 at their one inputs. Since, on the other hand, the decoder DE is set so that "1" appears at the output stage 0 thereof, the only one AND gate A4 is gated on to pass that pulse therethrough to set the flip-flop FF3. Also the production of the output of the comparator COM causes the AND gate A6 to be gated on so that the clock pulse train from the oscillator OSC are passed therethrough to the main counter MC, thus initiating a timed interval for exposure. As has been mentioned above, the computed value of exposure time is 1/1000 second. This leads to select the NAND gate N1 for passing the output pulses from the flip-flop F4 of the counter MC therethrough and through the AND gate A1 to the counter CON.

It is now pointed out that since, as has been mentioned above, the flip-flip FF3 is in "1" condition, the counter CON after having counted four pulses, causes the flip-flop FF4 to change its output to "1" at which the NAND gate N20 produces a shutter closing signal. In other words, the divided frequency of the pulse train at F4 is 8 [KHz]. Therefore, the timing circuit essentially comprising the MC and CON produces an actuating pulse for driving of the magnet driver MD after the timed interval $(1/8(KHz)) \times 4 = (1/2(KHz)) = 0.5$ (millisecond) from the application of the counting pulse to the MC at its input stage F1. Then, the magnet driver MD drives the trailing curtain control magnet Mg for operation. In the response time lag Tmg of this magnet Mg, the trailing curtain starts to run down, thus terminating the exposure.

We see again that according to one of the features of the present invention, the time correction circuit RT, Cl, S1, COM is employed to provide the adjusting time interval $Tx=Tg-Tmg+Tc$. Hence we obtain:

$$TA + Tg = Te + Tmg + Tx$$
$$= Te + Tmg + (Tg - Tmg + Tc)$$
$$= Te + Tg + Tc.$$
$$TA = Te + Tc$$
$$Te = TA - Tc.$$

That is, the timing circuit provides a shorter timed interval than the time interval that gives a correct exposure to the film by a certain time interval Tc. Even in case where $|Tmg| > |Tg|$ as the speed of running of the shutter curtain is increased, precise control of the exposure time can be ensured. In more detail, the present invention is, as has been mentioned above, to allow for $Te=TA-Tc$ to be embodied. Even when the Tmg exceeds the Tg, therefore, the provision of the adjusting time interval Tx assures that, from the above-defined formula: $TA+Tg=Te+Tmg+Tx$, it is found that $$TA = Te + Tmg + Tx - Tg$$
$$= Te + (Tmg - Tg) + Tx$$
$$= (TA - Tc) + (Tmg - Tg) + (Tg + Tmg + Tc) = TA$$

and therefore that the film is correctly exposed.

Next explanation is given to the process for producing an exposure time of 1/500 second. In this case, as shown in FIG. 4, the decoder DE produces "1" output at the output terminal 1, and the NAND gate N2 is selected. When the camera is released, therefore, the leading curtains run down, and, after the termination of the adjusting time interval $Tx=Tg-Tmg+Tc$, the comparator COM produces an output, causing the AND gate A3 to produce a pulse which is applied to set the flip-flop FF2. For this reason, when the counter CON has counted six pulses, the FF4 produces "1," causing the NAND gate N10 to produce the shutter closing signal. It is also noted that for this shutter time, the NAND gate N2 is selected to effect counting of pulses of 4 KHz from the flip-flop F5. Therefore, the timed interval Te becomes equal to $(1/4 KHz) \times 6 = 1 + 0.5 = 1.5$ (ms) which coincides with the value obtained by subtracting the constant time interval $Tc=0.5$ (ms) from the effective exposure time $TA=1/500$ second$=2$(ms), that is, based on the formula $Te=TA-Tc$. Likewise in the foregoing case with 1/1000 second, precise control of exposure time is obtained. Also for 1/250 second$=4$ (ms), the process begins with the production of "1" at the output terminal 2 of the decoder DE and at the same time the selection of the NAND gate N3. Then, the flip-flop FF1 of the counter CON is set and after having counted 7 pulses of 2 KHz causes the NAND gate N10 to produce the shutter closing signal. Thus, the timed interval takes a value of $(1/2 KHz) \times 7 = 3 + 0.5 = 3.5$ as obtained by subtracting the constant time interval $Tc=0.5$ from $TA=4$ (ms), and this leads to take an exposure with the time interval of 4 ms.

Figure 5:
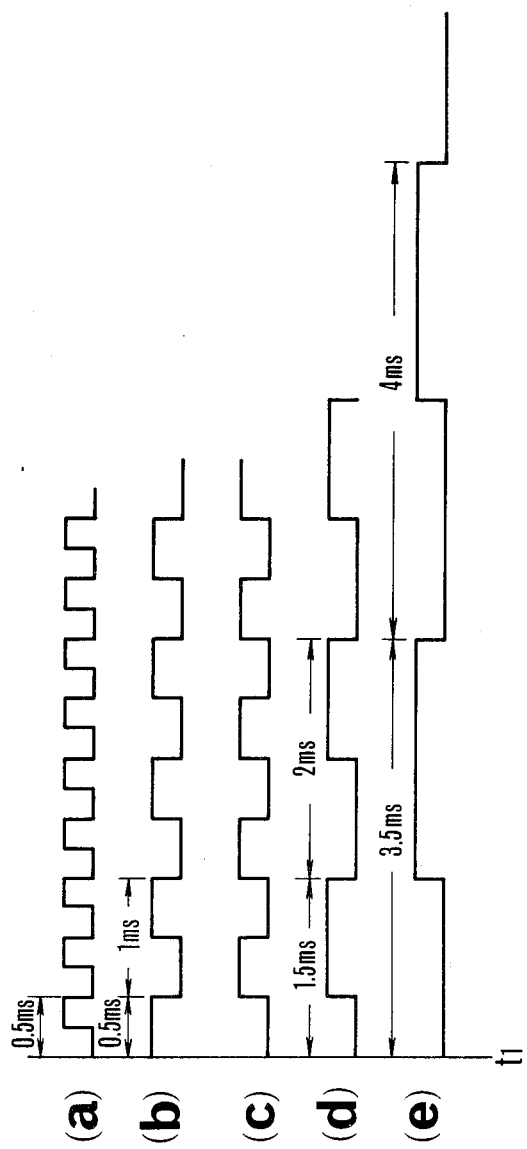
FIG. 5 is a waveforms of the outputs of the various bits of the main counter MC of FIG. 3.

Next explanation is given to the process for producing an actual exposure time of 1/125 second$=8$ ms. In this case, as is evident from FIG. 4, "1" is produced at the output terminal 3 of the decoder DE, and selects the NAND gate N4. For this reason, even when the production of a pulse from the one-shot ON1 at the termination of the adjusting time interval Tx occurs, the counter CON is not preset. When the number of pulses counted by the counter CON reaches eight, the NAND gate N10 produces the shutter closing signal. Because of this, it appears at a glance that the sum of the eight pulses of 1 KHz from the NAND gate N4 has determined the timed interval as being equal to $(1/1 KHz) \times 8 = 8$ ms. In this case, however, the flip-flop F7 has been set by the pulse of the one-shot circuit ON1, and this flip-flop F7 started to produce "1" at a time point $t_1$ as shown in FIG. 5(b) in synchronism with the initiation of a time counting operation of the main counter MC. Another fact is that since the output of the flip-flop F6 is of 2 KHz, the flip-flop F6 produces pulses with their trailing edges occurring at every 0.5 ms from the start point in time $t_1$ at which a time counting is initiated. For this reason, responsive to the trailing edge of the pulse of the flip-flop F6, the flip-flop F7 changes its output to "0" after 0.5 ms from the start point in time $t_1$. From then onwards, it produces pulses with their trailing edges occurring at every 1 ms. Therefore, the pulses produced through the AND gate A1 take a waveform as shown in FIG. 5(c). Thus, the time interval necessary for the counter CON to count 8 pulses in synchronism with the leading edges thereof is found to be 1 (ms)$\times 7+0.5$ (ms) which coincides with the value obtained by subtracting the constant time interval $Tc=0.5$ ms from the effective exposure time $TA=1/125$ (sec.)$=8$ (ms). At the termination of the timed interval of 7.5 (ms), the shutter closing signal is produced with the result that the actual time of exposure of the film is 1/125 second.

Next explanation is given to the process for producing a timed interval with the time of exposure of the film taking a value of 1/60 second$=16$ ms. In this case, as shown in FIG. 4, the NAND gate N5 is selected to pass pulses of 512 Hz from the flip-flop F8 to the counter CON. In a similar manner to that described in connection with the process for 1/125 sec. the termination of a counting of eight pulses is followed by the production of the shutter closing signal. It should be pointed out that since the flip-flop F8 operates in synchronization with the trailing edges of pulses of the flip-flop F7 (FIG. 5(b)), it produces a first pulse with the trailing edge after 1.5 ms from the counting start point in time $t_1$ followed by those occurring in every 2 ms. Therefore, the timed interval Te is found to be 2 ms$\times 7+1.5$ ms$=15.5$ ms which coincides with the value obtained by subtracting the constant time interval $Tc=0.5$ ms from the effective exposure time $TA=16$ ms. Thus accurate control of exposure time is performed. Such process holds likewise for the rest of the exposure time series, or 1/30 to 8 seconds, as the timed interval is obtained by subtracting the constant time interval $Tc=0.5$ ms from the computed exposure time TA, while the actual exposure time is adjusted to the computed one with high accuracy.

The foregoing explanations have been made on assumption that the exposure time is adjusted in exactly one-step increments. If the exposure time value found is an intermediate between the successive two discrete values in the series, the contents of the flip-flops D1 to D3 of the register RE are then made to have a prescribed choice of the exclusive NOR gates exN1–exN3. After the above-described time counting based on the one-step increments has been completed, therefore, the counter CON further proceeds to count a number of subsequent pulses depending upon the fractional time information. When that timed interval is terminated, as all the exclusive NOR gates exN1–exN3 produce "1," the shutter closing signal is produced from the NAND gate N10. Thus, even when the exposure time takes an intermediate value, accurate control of exposure time can be always ensured.

As has been described in greater detail, the exposure time control circuit of the present invention allows even for subtraction of a certain time interval from the effective time of exposure of the film to be carried out in providing a timed interval, whereby the adjusting time interval can be varied in a wider range to ensure that precise synchronization between the slit shutter and the control circuit therefor can be obtained even when the time gap depending upon the partial overlap of the shutter curtains becomes shorter than the response time lag of the magnet as the speed of running down movement of the shutter curtain is increased.

What is claimed is:

1. An electrical exposure time control device for a camera having a shutter, comprising:
   (a) first timing means for forming a given time interval;
   (b) second timing means for forming a compensation time interval;
   (c) means for maintaining the opening of said shutter for a total time interval of the given time interval and the compensation time interval so that the shutter is opened for a desired exposure time; and
   (d) control means for shortening the given time interval formed by the first timing means by a predetermined time interval so as to be shorter than the desired exposure time;

said first timing means including:
   (a) a main counter for dividing the frequency of an input pulse signal;
   (b) a presettable counter for counting the frequency divided pulse signal from the main counter and for storing data related to the desired exposure time;
   (c) detecting means for applying a shutter closing signal to the maintaining means when the presettable counter has counted pulses corresponding to the data stored in the presettable counter.

* * * * *